United States Patent
Klemm et al.

(10) Patent No.: US 7,124,413 B1
(45) Date of Patent: Oct. 17, 2006

(54) FRAMEWORK FOR INTEGRATING EXISTING AND NEW INFORMATION TECHNOLOGY APPLICATIONS AND SYSTEMS

(75) Inventors: Dirk M. Klemm, Chicago, IL (US); Richard A. Chang, Gurnee, IL (US)

(73) Assignee: Accenture LLP, Palo Alto, CA (US)

( * ) Notice: Subject to any disclaimer, the term of this patent is extended or adjusted under 35 U.S.C. 154(b) by 438 days.

(21) Appl. No.: 09/705,577

(22) Filed: Nov. 3, 2000

Related U.S. Application Data (60) Provisional application No. 60/163,477, filed on Nov. 3, 1999.

(51) Int. Cl.
- G06F 3/00 (2006.01)
- G06F 9/44 (2006.01)
- G06F 9/46 (2006.01)
- G06F 13/00 (2006.01)

(52) U.S. Cl. ........................ 719/313; 717/101
(58) Field of Classification Search ................ 709/310, 709/328; 717/100–116; 719/310, 328, 311–320
See application file for complete search history.

(56) References Cited

U.S. PATENT DOCUMENTS

| | | | |
|---|---|---|---|
| 5,321,610 A | 6/1994 | Breslin | |
| 5,524,047 A | 6/1996 | Brown et al. | |
| 5,524,253 A | 6/1996 | Pham et al. | |
| 5,596,744 A * | 1/1997 | Dao et al. | 707/10 |
| 5,797,006 A | 8/1998 | Sitbon et al. | |
| 5,851,117 A | 12/1998 | Alsheimer et al. | |
| 5,991,794 A | 11/1999 | Hodges et al. | |
| 6,041,362 A * | 3/2000 | Mears et al. | 709/310 |
| 6,064,813 A | 5/2000 | Sitbon et al. | |
| 6,208,345 B1 * | 3/2001 | Sheard et al. | 345/853 |
| 6,418,324 B1 * | 7/2002 | Doviak et al. | 455/426.1 |
| 2002/0035577 A1 * | 3/2002 | Brodersen et al. | 707/201 |

FOREIGN PATENT DOCUMENTS

GB 2 315 891 A 2/1998

OTHER PUBLICATIONS

Ryan, Hugh W., et al., "Practical Guide to Client Server Computing", Second Edition, 794 pages, CRC Press LLC (1998).
Ryan, Hugh W., et al., "Netcentric Computing", 431 pages, CRC Press LLC (1998).
Client/Server Programming with OS/2 2.0, XP-002164217, Chapter 1-2, 8-10 and 26 pp. 10-24, 111-123, 125-137, 149-160 and 588-594 (1992).
Orfali, R. and Harkey, D., "Client/Server with Distributed Objects," Byte, 8 pages (Apr. 1995).
Orfali, R., Harkey, D. and Edwards, J., "Intergalactic Client/Server Computing, Special Report," Byte, 7 pages (Apr. 1995).
Smeets, J. and Boyer, S., "Internet and client server patent information systems: new services from Derwent" *Derwent Information*, 4 pages (1999).
Borsook, P., "Seeking Security," Byte, 7 pages (May 1993).

* cited by examiner

*Primary Examiner*—William Thomson
*Assistant Examiner*—Diem Cao
(74) *Attorney, Agent, or Firm*—Brinks Hofer Gilson & Lione (57) ABSTRACT

A framework and method for using the framework are disclosed for integrating disparate components, such as existing and new components, on a computing network system. The existing network may include useful existing content repositories, such as data repositories, and existing computer architectures. With the addition of new systems on the network, the framework can aid an architect in choosing a framework integration layer that allows for the integration of the disparate components.

38 Claims, 5 Drawing Sheets

FRAMEWORK FOR INTEGRATING EXISTING AND NEW INFORMATION TECHNOLOGY APPLICATIONS AND SYSTEMS

REFERENCE TO EARLIER FILED APPLICATION

The present application claims the benefit of U.S. Provisional Application No. 60/163,477, filed Nov. 3, 1999, which is incorporated by reference herein.

BACKGROUND OF THE INVENTION

Expenditures on information technology (IT) have risen over the past twenty years to the point where they are almost always a significant amount in the capital budget of any enterprise. These enterprises include business enterprises, and may also include non-for-profit businesses, charitable institutions, religious institutions, educational establishments, governmental agencies, non-governmental organizations, and other organizations of many types.

The expenditures are not only for computers and their software, but also for making disparate computers and information technology applications and systems work together. Once systems are established, servers of several varieties may be used, as well as other software, networks, computers and peripherals. Businesses typically invest a large amount of capital in making new systems and applications work with an existing system and periodically need to upgrade components of an existing system to better serve the businesses' customers with advanced technology.

In the past, organizations have built applications on specific hardware and software technologies like networks, servers, operating systems, database, application development models and specific end user access devices. The customized infrastructure and architecture provided users with applications that did not communicate with one another. While the initial intent of the application systems were to meet a specific set of functionality, eventually these different application systems needed to be integrated. Technology today provides many different ways to integrate applications and systems.

There is a need, therefore, to construct an IT framework that provides a way of identifying and selecting a correct integration solution.

BRIEF SUMMARY OF THE INVENTION

The present invention is defined by the following claims, and nothing in this section should be taken as a limitation on those claims. By way of introduction, one embodiment of the invention is an Integration Architecture Framework that allows an architect to connect existing, or legacy, system on a computer network with new or different systems on the computer network. The existing network may include useful existing content repositories, such as data repositories, and existing computer architectures.

The Integration Architecture Framework provides the architect a guide for integrating applications of the computer network and for determining how to integrate specific applications. The integration architecture framework allows the architect to identify the different types of integration options available that may help solve a specific business integration problem. Finally, the integration architecture framework aids the architect in determining what components are required to deliver the selected integration style.

These and other features and advantages of the invention will become apparent upon review of the following detailed description of the presently preferred embodiments of the invention, taken in conjunction with the appended drawings.

BRIEF DESCRIPTION OF THE DRAWINGS

The present invention is illustrated by way of example and not limited in the accompanying figures.

TABLE OF ACRONYMS

The following table aids the reader in determining the meaning of the several acronyms used to describe the embodiments:

API=application program interface.
CD=compact disc.
DLL=data link layer.
EDI=electronic data interchange.
FTP=file transfer protocol.
GIOP=General Inter-ORB Protocol.
GUI=graphical user interface.
IIOP=Internet Inter-ORB Protocol.
ISDN=integrated services digital network.
IT=information technology.
LAN=local area network.
LA/LT=Local Acknowledgment/Local Termination.
MAPI=Messaging API.
ORB=object request broker.
PC=personal computer.
PDA=personal digital assistant.
TCP/IP=Transmission Control Protocol/Internet Protocol.
TP=transaction processing.
WAN=wide area network.

DETAILED DESCRIPTION OF THE INVENTION

A framework for implementing components of a legacy system with disparate components or components of a new system is disclosed. The following description is presented to enable any person skilled in the art to make and use the invention. For purposes of explanation, specific nomenclature is set forth to provide a thorough understanding of the present invention. Descriptions of specific applications are provided only as examples.

Figure 1:
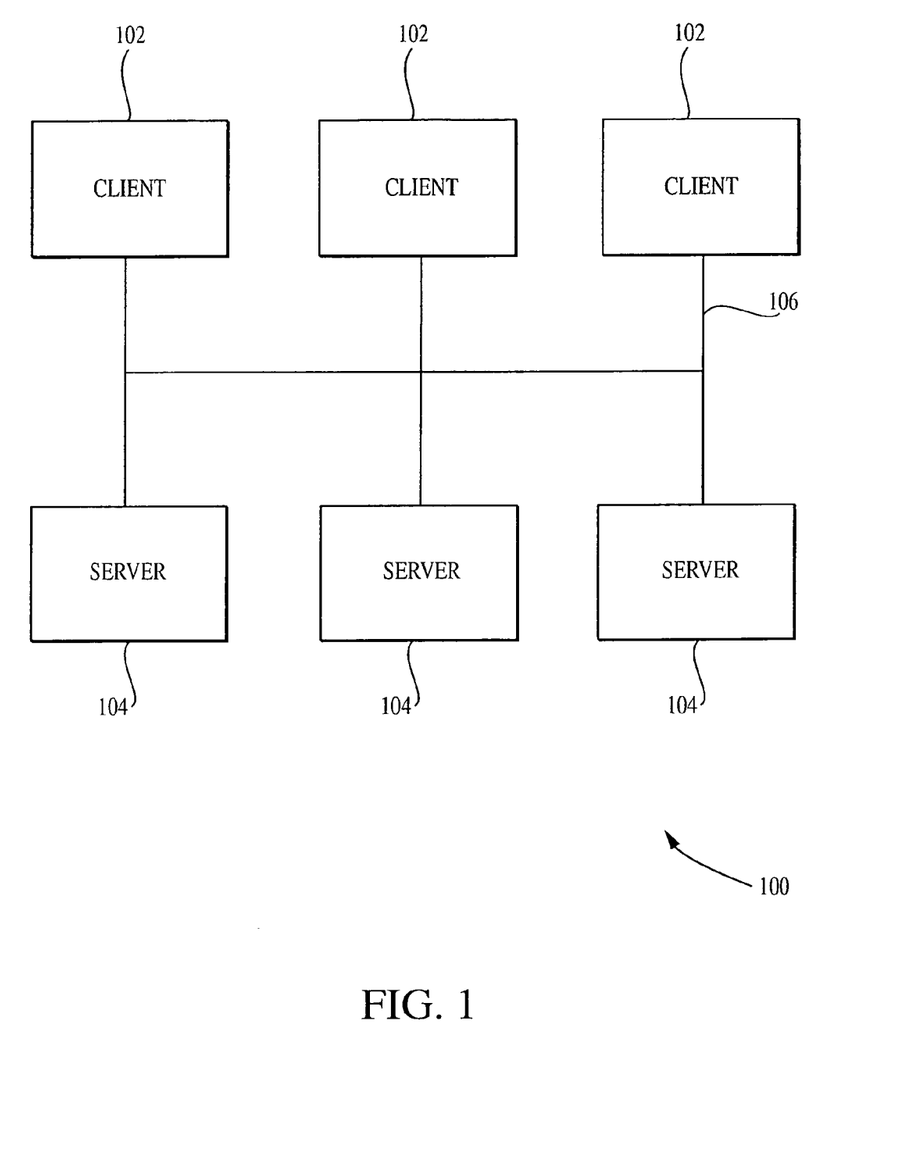
FIG. 1 is a block diagram illustrating an exemplary client/server network.

Referring now to the drawings, FIG. 1 illustrates an exemplary distributed system 100, such as a computer network, configured with clients and servers. The block diagram of FIG. 1 therefore shows a distributed system 100 comprising a plurality of client computers 102 and a plurality of servers 104, all of which are connected to a network 106. It should be understood that the present invention applies to mainframe and client/server styles of computing, and may be applied to other styles of computing such as the netcentric style.

The client 102 is a member of a class or group that uses the services of another class or group to which it is not related. In the context of a computer network, a client is a process (i.e., roughly a program, task or application) that requests a service that is provided by another process, known as a server program. The client process uses the requested service without having to know any working details about the other server program or the server itself. A server 104 is typically a remote computer system that is accessible over a communications medium such as an intranet or Internet. The client process may be active in a second computer system, and communicate with the server process over a communications medium that allows multiple clients to take advantage of the information-gathering capabilities of the server. Thus, the server essentially acts as an information provider for a computer network.

Client/server networks may include local area networks (LANs), other wide area networks (WANs), and regional networks accessed over telephone lines, such as commercial information services. The client and server processes may even comprise different programs executing simultaneously on a single computer. The client computers 102 can be conventional personal computers (PCs), workstations, or computer systems of any other size. Each client 102 typically includes one or more processors, memories, input/output devices, and a network interface, such as a conventional modem. The servers 104 can be similarly configured. However, the server 104 may each include many computers connected by a separate private network. In fact, the network 106 may include hundreds of thousands of individual networks of computers.

Figure 2:
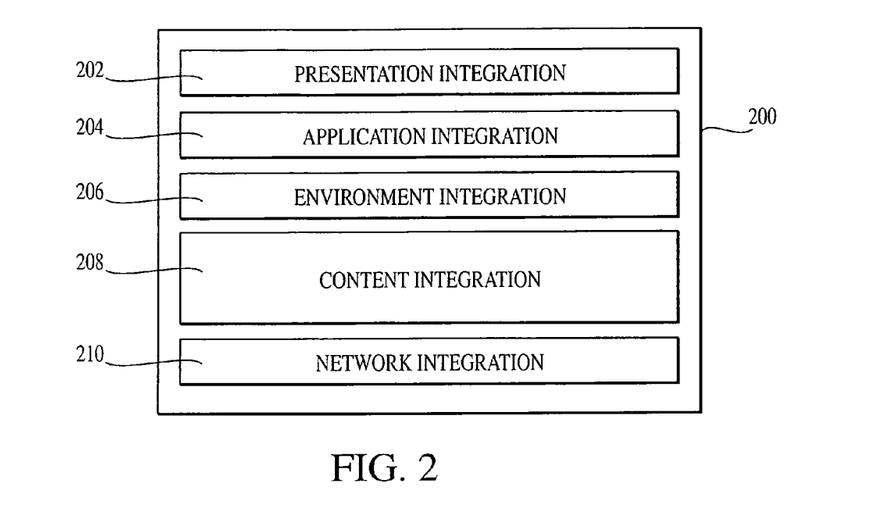
FIG. 2 is a block diagram illustrating an integration architecture framework.

Illustrated in FIG. 2, an Integration Architecture Framework 200 addresses business goals of modernizing old, or legacy, network systems, into new integrated application systems. The Integration Architecture Framework 200 describes the layers for integrating disparate components on a computer network. The integration can take place and the services that allow both new and legacy systems to be integrated together across many different platform types, i.e., operating systems, across different data structures, using different applications and different presentation platforms. Integration of the disparate components preferably appears transparent to a computer network user, or an application or other component on the computer network.

An architect can use the Integration Architecture Framework 200 to identify the layer at which the application systems can be integrated. The Integration Architecture Framework 200 includes a presentation integration layer 202, an application integration layer 204, an environment integration layer 206, a content integration layer 208 and a network integration layer 210. As used, the term layer does not mean that one layer must be considered or integrated before another layer can be considered or integrated. Rather, the layers can be considered or integrated in any order. One or more of the layers are typically used to integrate disparate applications and network systems.

I. Application Integration Layer 204, illustrated in FIG. 3, allows the sharing business functionality between applications utilizing different delivery vehicles. An application is a program, such as a human resources employee management system or general ledger system, which performs a task or tasks for end user use. Application Integration layer 204 allows applications using one messaging format to communicate with applications based on a different message format. For example, the Application Integration layers 204 allow an application delivered using one messaging capability to communicate with application functionality delivered using another messaging capability. The Application Integration layer 204 is typically used when business functionality (application logic and data) in one application is required by another application. Rather than rewriting the functionality, Application Integration layer 204 allows the business functionality to be shared by both applications.

Figure 4:
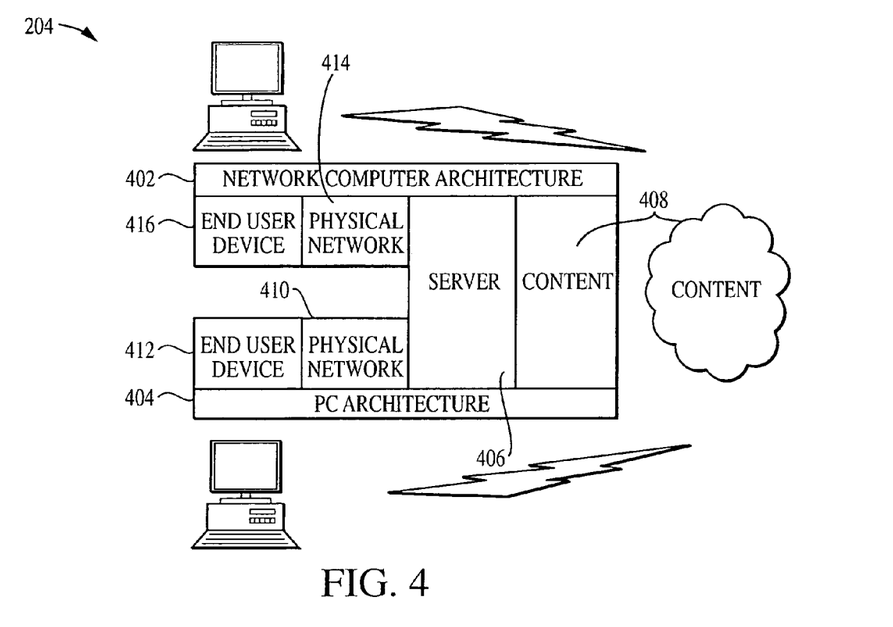
FIG. 4 is a logical block diagram representing components of an application system targeting different end user access devices.

FIG. 4 illustrates components of an exemplary Application Integration layer 204 that employs a shared server 406 and shared content 408, where the content 408 includes data shared by different applications. The Application system 204 may include a network computer 402 and a PC computer 404 that are connected via the shared server 406 and shared content 408. In addition, the PC computer 404 connects with a first physical network 410 and a first end user device 412, such as a personal computer (PC). The network computer 402 connects with a second physical network 414 and a second end-user device 416. Thus, the Application Integration layer 204 allows end users to access the shared server 406 and shared content 408.

Figure 5:
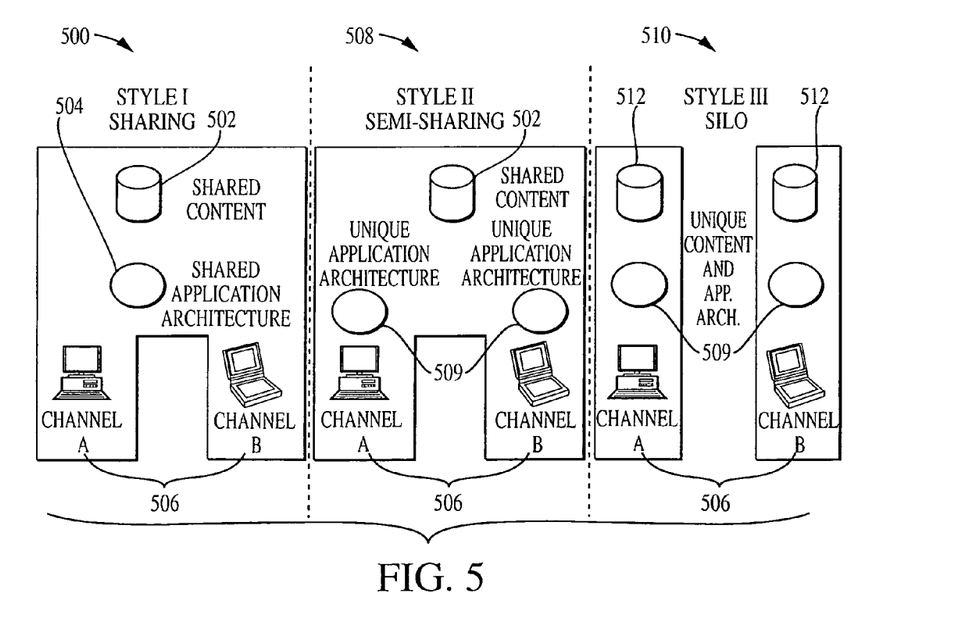
FIG. 5 is a logical representation of different components that may be shared between application systems.

End user access implementation styles are illustrated in FIG. 5. In Style I, generally 500, multiple access channels share content 502 as well as application logic 504. Style I channels 506 offer a similar set of business processes to end-users, thus the end-users can share business logic. Style I offers a high level of reuse of legacy architecture components. Style I also allows potential cost savings since each channel 506 does not have its own data 502 and application architecture 504. Since there is a common data and application source, maintenance of the system is potentially simpler because there are fewer components to manage. Because the architecture is designed to be channel independent, additional channels 506 may be added more easily to the architecture. An example of a Style I implementation would be an application written to allow a PC internet browser and wireless personal digital assistant (PDA) to access the same application over the Internet.

Style II's architecture, generally 508, shares content among access channels 506, but utilizes unique application architecture 509 for each channel 506. Though Style II does not share as much of the architecture as Style I, Style II may be appropriate if different channels are intended to support different business processes. Also, an application may not be able to support multiple channels. For example, a custom application written for corporate LAN users, might not be able to handle Internet requests. In this case, a new web application is added to support the web access channel. However, both the custom application and web application servers may share a common database 502. An example of a Style II implementation is adding a transaction processing (TP) server to manage requests to a common database. A server for the custom application and a web server would use the TP to access shared data. However, application logic resides separately on the server for the custom application and the web server.

Style III's, generally 510, access channels 506 uses unique application logic 509 and unique data 512. Each channel 506 delivers business capabilities to end-users without sharing services with other channels 506. Optionally, content can be shared among databases through replication, file transfer, or synchronization processes. Style III does share content, however, because each channel 506 maintains its own content source. Since channels 506 use unique data 512 and application logic 509, adding a new channel 506 requires no changes to the existing channels 506.

Each channel's unique data 512 and unique applications 509 are optimized for that particular channel 506. Also, other channel requests do not impact the channel's application or database servers. Security is potentially simpler since each channel 506 can decide the security levels for that channel's users. When sharing application and data, security issues become more complex since more users have access to the applications and data, and each channel may require different levels of access to information. An example of a Style III architecture is a custom client/server application serving PCs on a LAN alongside a web server with each server including its own copy of data. Changes to the business functions may require changes to the client/server's application and data, as well as the web server's application and data.

Referring again to FIG. 3, to facilitate application integration, the Application Integration layer 204 includes Data translation 302 and Message translation 304 components. Data translation services 302 provide mapping and translation of information from one format into another format. Data translation services 302 keep track of the processes that take place in the translation from one format to another and the order in which the process occurs. Data translation services 302 also translate between native terminal characteristics into the standardized representation, e.g., ASCII to EBCDIC, Big Endian to Little Endian or character mode to block mode. Exemplary data translation services are BEA MessageQ; IBM MQ Series; RMS OmniTrans; and file transfer protocol (FTP).

Figure 3:
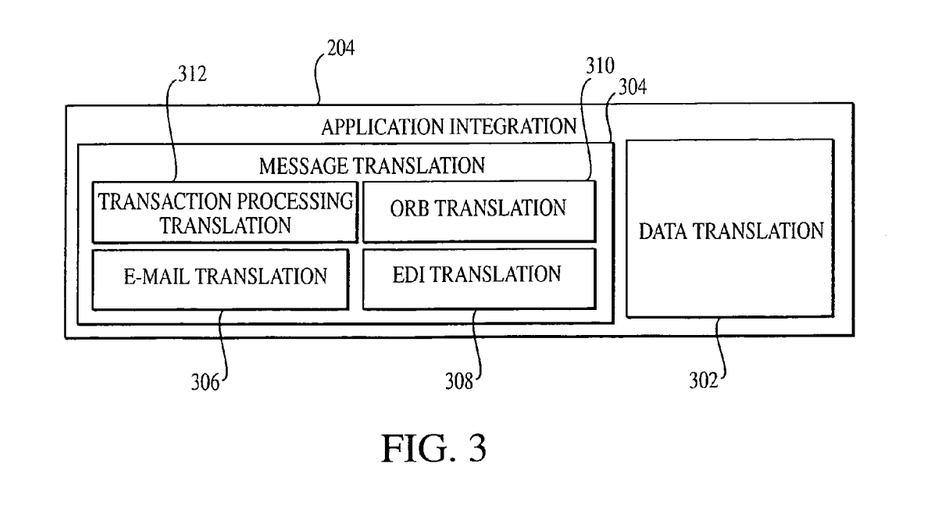
FIG. 3 is a block diagram illustrating components included in the application integration layer of the integration architecture framework of FIG. 2.

Message translation services 304 translate messages from one format to another. The Message translation services 304 allow different technology message formats like CICS or ABAP to be understood by new message formats. The format of these messages may include Object Request Broker (ORB), Transaction Processing (TP), FTP, E-mail, electronic data interchange (EDI) or Data translation services 302. These services are sometimes referred to as message gateways. They provide the ability to reuse business logic within other applications without rewriting the code.

The Message translation services 304 can be divided into two categories, Message Passing and Message Queuing. Message Passing is the direct exchange of information between a sending and receiving application. Message passing is used at the time the message is sent. Message queuing is a method of sending data from one application to another in which the data is queued in computer memory. The message remains in the queue until the target program can receive the data, whether milliseconds or hours after the message arrives in the queue. Adding multiple access channels (e.g., channels 506, FIG. 5) to an application may require more complex routing services that can increase delays. For example, a transaction processor (TP) server can add overhead as the TP routes messages from multiple channels.

Message translation services 304 include E-mail translation services. E-mail Translation Services 306 allow two different e-mail packages to communicate with one another (e.g. Lotus Notes and MS Mail). Integrating the two different e-mail packages allow users in one e-mail environment to get messages from another e-mail environment. Different strategies exist for integrating e-mail environments, such as, point-to-point gateways, message switches, client drivers, and backbones, which can be used alone or combined. A point-to-point gateway is an e-mail system add-on that provides bi-directional message-format translation and transport between two dissimilar mail systems.

A central message switch connects multiple e-mail environments via gateways in a hub-and-spoke design, where the message switch is the hub and the gateways are spokes. The chief architectural difference from the point-to-point gateway is that a gateway no longer connects two e-mail environments directly but connects each e-mail environment to the central switch. Message switches translate the sender's message format first into a central message switch format and then into the recipient's format. In contrast, gateways may translate from one vendor format directly to another. Switches communicate with mail systems using the mail system's preferred protocol, whether X.400, SMTP, or proprietary protocols used by Exchange, GroupWise or Notes.

A client driver (also called a "service provider") is software that runs on the e-mail client (e.g., client 102, FIG. 1). The client driver picks up the client's e-mail-related software calls and redirects them to e-mail-related services (e.g., server 104, FIG. 1). To redirect the e-mail, the client driver translates the client's native software calls into native protocol requests for the foreign system. For instance, calls made by a cc:Mail client could be redirected to an HP OpenMail server. The client driver accomplishes this by translating either proprietary cc:Mail calls or Messaging API (MAPI) calls (in the case of the cc:Mail MAPI client) into OpenMail protocol requests.

Standards-Based Backbones can integrate disparate mail systems by linking them to servers (e.g., server 104, FIG. 1) that support standard protocols such as SMTP or X.400. The backbone approach is typically used with one or more of the other integration approaches (gateways, message switches, client drivers). However, instead of translating into a proprietary messaging protocol, the gateway, message switch, or client driver translates messages into the standard backbone protocol. An advantage of the backbone approach is that Gateways, message switches, and client drivers from multiple vendors can be integrated into a single system, typically at a lower cost than proprietary solutions, and without locking customers into a single vendor's e-mail integration solution.

Another message translation service, electronic data interchange (EDI) Translation Service 308, translates an EDI file into an interface file and vice versa. EDI integration is achieved through bridging two distinct data streams. An EDI data stream is integrated with the application data stream. In other words, transactions are created (or processed) by an application, translated into (or from) EDI and sent to (or received from) a trading partner through an automated and integrated process, preferably without human intervention.

Additionally, an Object Request Broker (ORB) Translation Service 310 defines mechanisms that support interoperation among ORBs. Thus, a client in one ORB can invoke an operation of an object in another ORB. The ORB Translation Service includes three main components. An Internet Inter-ORB Protocol (IIOP) supports interoperability in the transport domain of Transmission Control Protocol/Internet Protocol (TCP/IP). A DCE-CIOP supports interoperability among DCE-based ORBs. Finally, a General Inter-ORB Protocol (GIOP) and CORBA extensions support the construction of bridges to non-compliant ORBs and ORBs in different transport domains.

Finally, Transaction Processing (TP) Translation Services 312 allow two different Transaction Processing monitors (e.g. Tuxedo and CICS) to communicate with each other. TP Translation Services 312 allow for interoperability between different TP monitors. Integration is bi-directional and preserves the native application program interfaces (APIs) of each environment. As a result, no changes are required to either transaction processing environment. An architect should consider the impact of the additional translation steps, additional network traffic, the need to be able to manage the logical unit of work as a transaction and implications that may have on the solution.

Figure 6:
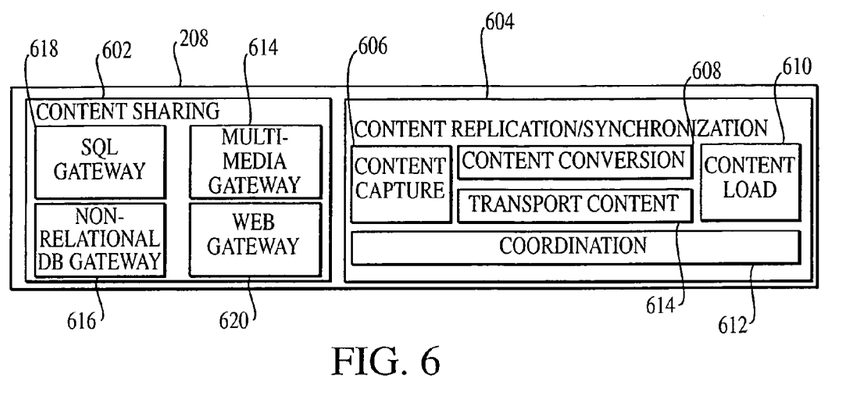
FIG. 6 is a block diagram illustrating components included in the content integration layer of the integration architecture framework in FIG. 2.

II. Content integration layer 208 provides the ability to share data, voice, images, documents, and unstructured data between delivery vehicles. Content integration layer 208 is different from application integration 204 because Content integration layer 208 does not integrate business logic, only the content. Content integration layer 208 can be divided into content sharing 602 and content replication 604. Content sharing 602 provides the ability to share content real-time or near real-time from a source location. For example, data that is stored in one database could be accessed from a delivery vehicle in real-time. The content sharing approach is typically used when the quality of the data in the source application is high.

Content replication 604 provides the ability to share content by copying data from the source location to the other locations when required. For example, the content stored in a Lotus Notes database may be replicated to a Sybase database. Content replication 604 is typically done on a scheduled/batch type of approach, although replication can occur real-time on a transaction by transaction basis. Content replication 604 is typically used when the quality of data is not high and some conversion needs to take place between applications, although a high quality source data scenario may also replicate data to meet some performance or availability requirements.

A. Content Replication/Synchronization Services 604 support an environment in which multiple copies of the content are maintained. The need to keep multiple copies may result from the limitations of existing legacy applications and technologies or from the need to deliver better availability or recoverability of a distributed application. Replication/Synchronization can be done either real-time or on-demand, and can be initiated by a user, program or a scheduler. There are three basic replication styles depending on the amount of latency that is acceptable: synchronous real-time access for all sites (approximately no latency), asynchronous near real time access and asynchronous Batch/Periodic latency for all sites.

i. Content capture services 606 extract data that needs to be replicated/synchronized. The data capture service may either capture the change as it occurs in a change log (transaction level) or identify all of the changes in an extract program overnight (batch level). Capturing the change as it occurs typically requires a change to the source application and database. This may come in the form of using triggers in the database or having the application write to both the database and the log. Content data capture typically is used to support more real-time replication or when it is difficult to identify when a transaction was completed.

Extracting all the changes that need to be replicated in a batch typically impacts the source application and database less. Extraction is typically accomplished by writing a program to extract all the new transactions since the last replication. The extraction type of data capture is typically used to support basic interfaces in a nightly batch mode. A system architect should determine the amount of change required to the source system to implement either the extract or data capture option.

ii. Content conversion services 608 resolve inconsistencies in data with regard to syntax, definitions, and formats between the source, e.g. client, and target, e.g., server, systems. The types of conversion these services can address are divided into three basic categories, Syntactic, Structural and Semantic. Syntactic issues are surface differences, usually the result of typing or data-entry. The Syntactic part of the conversion phase cleanses the data and the other two parts deal mainly with coordinating the data as it comes in from different sources. Structural issues refer to the case where internal representation of data is inconsistent between sources. Semantic problems occur when the user's interpretation of the data may differ, or when the disagreement among source records requires human intervention to resolve.

Data Conversion tools extract data into specialized engines, apply transformation functions real time and load properly formatted data for loading into a target database. Data Conversion Engines process data mappings and transformations in memory. The Data Conversion approach increases throughput and streamlines the number of steps required to set up and revise the transformation processes. Many data conversion engines contain schedulers that coordinate all phases of the data migration process: cleansing, extraction, data movement, transformation, loading and metadata capture.

Since there are typically a variety of sources, the data interfaces are likely to originate from several platforms. Therefore, an issue to consider is upon which platform the conversion process will take place. Possibilities include one of the source platforms, the target platform, or an independent platform. The application may also be distributed across several different platforms. If a third-party tool is used, the choice may be restricted to the platforms upon which the conversion tool is designed to run. Preferably, conversion rules are stored in tables, not hard coded into the program, unless a code generator based on rules tables is used.

iii. Content Load Services 610 can be used in several places within the architecture (intermediate steps or final destination). The function of these services is to load large amounts of data from one format to another. The loading may take the form of loading data from one Oracle table to another Oracle table or it could take the form of loading data from a UNIX flat file format to an Oracle database. An architect should consider that some load services may by-pass the business rules stored within the application that may require the rules to be applied to the content before being loaded.

iv. Coordination service 612 is used to compare the information in the source and target databases to ensure that they are consistent. When discrepancies or unanticipated changes are found, the coordination service analyzes and resolves the differences. The Coordination service 612 examines records or transactions to determine content and allow the user, or systems, to change the records to eliminate inconsistencies. The coordination service is a backup for ensuring data integrity in both the source and target databases. Due to the nature of the legacy systems involved in the replication tasks, exceptions often occur that cannot be dealt with until after they are loaded into the target database.

v. Transport content 614 is typically done via messaging or file transfer solutions.

B. Content Sharing services 602 enable an application to retrieve data from a database as well as manipulate (insert, update, delete) data in a common database. Content sharing is achieved through retrieval or manipulation from the common database. For example, it allows Visual Basic/ Oracle applications to access information stored in DB2 directly, without replicating. Content sharing can share content in the form of structured or unstructured data or multimedia, which includes: images, graphics, audio, non-linear video and 3D animation, analog film/video, and digital film/video.

Figure 7:
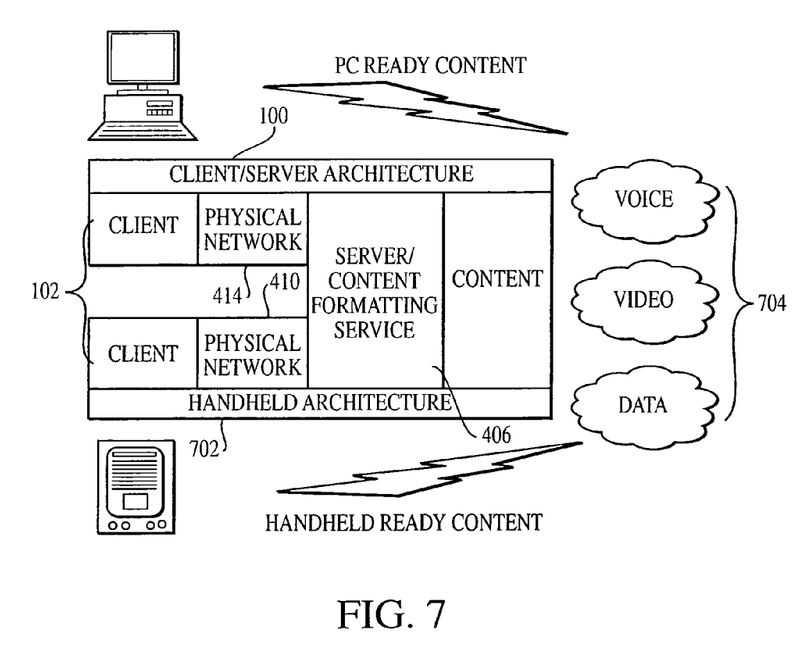
FIG. 7 is a logical block diagram of application systems delivering different types of content to different end-user devices.

When a business capability is delivered across multiple access channels, channel services may be required to accommodate variations in computing characteristics. The channel services may impact the application architecture, data architecture, and infrastructure of a business capability. An example of channel services is shown in FIG. 7. Both the client server architecture 100 and personal digital assistant (PDA) 702 may request content 704 in the form of voice, video, or data, however each device requires the content 704 in a different format. A Content Formatting Service formats the requested content 704 for specific end-user architecture such as the client/server architecture 100 and the PDA architecture 702. The Content Formatting Service allows the same content, e.g., voice, video, or data, to be handled by different devices.

i. Multi-media Gateway Services 614 translate SQL statements by users against data types such as documents, audio, video and images. The multi-media gateway services 614 allow SQL applications to access non-traditional data formats without changing the data access method (e.g. SQL) for the application. An exemplary multi-media gateway includes Visual Information Retrieval Technology by Virage, Inc., which allows users to search collections with keywords and visual similarity and instantly access these visual assets at different resolution levels.

ii. Non-relational Database Gateway Services 616 use a relational structure to interpret relational queries submitted by users against non-relational databases and data sets, for e.g. IMS databases, VSAM data sets or Lotus Notes databases. Non-relational Database Gateway Services provide communication, data access, and data mapping facilities to access non-relational data using relational queries. An exemplary non-relational database is DataJoiner, which allows the user to access and join data from different relational data sources (including the DB2 family, Oracle, Informix, Sybase, Microsoft SQL Server) and non-relational data sources (including IMS, VSAM) with a single SQL statement.

iii. SQL Gateways 618 provide a mechanism for clients to transparently access data in a variety of databases (e.g., Oracle, Sybase, DB2), by translating SQL calls written using the format and protocols of the gateway server or primary server to the format and protocols of the target database. Since all the clients connect through a single gateway, gateways may create bottlenecks. It should also be realized that since the data is accessed over a SQL gateway using the network, there can be potential performance issues.

iv. The Web Gateway Service 620 allows developers to use the web as a new data source to automate interactions with web based services. The web gateway service 620 enables a business application to retrieve data from a data source on the Web site. The intent of the web gateway service 620 is to allow applications built using traditional Client/Server technologies to access information on the Internet without rewriting the entire application.

Figure 8:
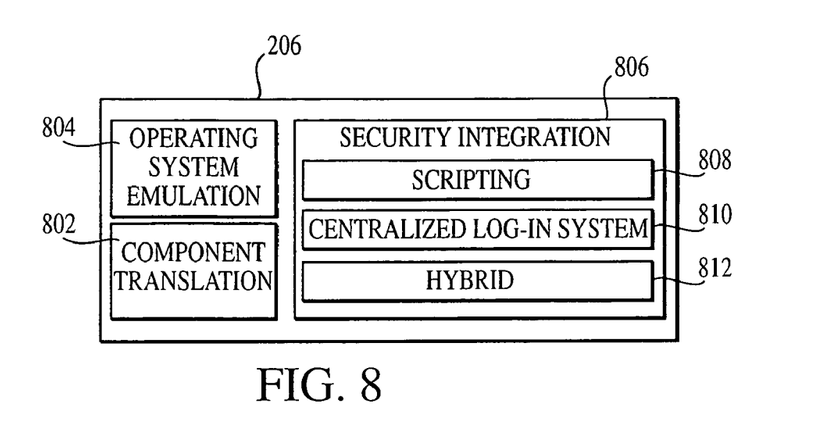
FIG. 8 is a block diagram illustrating components included in the environment integration layer of the integration architecture framework in FIG. 2.

III. Environment Integration layer 206, FIG. 8, illustrates exemplary components to integrate environment services. Common environment services include services like component translation 802, operating system emulation 804 and security integration 806. For example, environment integration services 206 may allow a UNIX application to run in an NT environment, or to provide single-user sign-on to both a MVS application and a UNIX application. Environment integration layer 206 is typically used to provide for simplified user interaction.

A. Component Translation Services 802 translate one component (e.g. ActiveX) to another component (e.g. Java Bean). This is different from ORB translation in that the message passed is not actually translated until in the component. The component is changed to become accessible by another component framework. For example, an ActiveX component would be wrapped to become a Java Bean. All messages could be sent based on CORBA. No DCOM messages would need to be sent. This concept is referred to as a wrapper.

B. Operating System Emulation Services 804 are tools that allow applications built on one operating system to run on another operating system. For example, by adding the emulation service a server would be able to run both an NT application and a UNIX application. There are potential drawbacks depending on which integration tool is selected. Software that uses commonly available though nonstandard libraries may require a significant amount of work to create missing application program interfaces (APIs). The architect should understand the set of APIs that are used by the application as well as provided by the emulation service.

C. Security Integration Services 806 also referred to as single sign-on services is the ability to log on to multiple computer systems or networks with a single user ID and password. The single sign-on system contrasts with the situation, where a user needs a password and user ID for each system, and the user must log on to each system separately. It can be difficult for users to manage multiple user IDs and passwords, and easier to remember just password. Single sign-on also relieves the end user of having to know log-in procedures for different platforms.

There are security issues for providing access to multiple systems via a single ID/password rather than requiring multiple IDs and passwords. First, single sign-on systems do not require that each user have a single user ID, password and log-on procedure. The single sign-on systems simply permit administrators to reduce the number of user IDs, passwords, and log-on procedures to a desired number, allowing administrators to manage the trade-off between convenience and security. Second, the system could be less secure for administrators to allow users to have many IDs/passwords rather than just one, since, when faced with remembering multiple passwords, users may compromise security and write passwords down in a non-secure place to avoid being shut out of the system. It is more secure to assign users a single, complex ID/password that they can commit to memory than to require them to memorize multiple IDs/passwords.

There are two main approaches to single sign-on, scripting 808 and centralized log-in systems 810. The two main sign-on approaches can also be combined, either within a single product or into a hybrid system 812 when products from two different vendors are combined. A centralized log-in system 810 spreads further into the network than scripting does. Centralized log-in systems 810 require a security server, server-side security software, and client-side security software. The security server runs two services, authentication and privilege. The authentication service provides a central checkpoint where prospective users prove that they really are who they claim to be, usually by providing a user ID and password. The privilege server confirms or denies rights to access particular resources based on the user's authenticated identity.

Server-side security software streamlines the log-in procedure because it handles many of the complexities involved in accessing remote systems. In UNIX, for instance, the security module on the protected system could set environment variables and terminal type and put the user in an appropriate directory. A security module on a database server could set limitations on what rows and columns the user sees. The client software in centralized log-in systems may offer some workstation security features along the lines of those offered by script-based systems. However, the workstation security features of centralized log-in systems are likely to be less rigorous and comprehensive than those of scripting systems.

In large, complex, active environments, the centralized log-in systems 810 will result in easier administration because of its centrally administered security services. Also, centralized security servers make it easy for administrators to add, change, or delete user IDs and passwords. Centralized log-in systems 810 improve enterprise-level security more than script-based systems 808. For instance, all login-related communications are usually encrypted. Encrypted systems are preferred since unencrypted log-in related communications could be intercepted by a network monitor for unauthorized later use. Key information packets are also preferably time-stamped to prevent a network monitor from picking them up, recording them and replaying them later. Architects can guard against a failing security server by setting up alternate security servers. Typically, each workstation is configured to authenticate via a given primary security server. If that server is unavailable, the workstation has the name of a secondary server to use.

Scripting 808 allows the user to log on to the single sign-on software, which then consults one or more scripts, instead of users having to perform the log-in procedures for each platform. The script(s) then perform log-in procedures on behalf of the user for all supported platforms. The script is contained in a text file that is written in a specialized programming language and is usually encrypted. Scripting 808, in contrast to centralized log-in systems 810, offers neither a centralized security service to initiate action nor software modules on the protected systems to carry the actions out reliably and securely. Scripts run at the end-user workstation and do not change the security framework beyond that. Scripts do not impact or change the access methods on protected systems (i.e., servers, hosts, networks) where sensitive data, applications, and/or communications facilities reside.

To gain the benefits of both scripting and centralized login approaches, architects may want to utilize a hybrid system 812. A hybrid single sign-on system uses a security server in conjunction with scripting. In a hybrid system, users are authenticated with a security server in order to get rights to run a script. The scripts are likely stored on the security server. Unlike centralized frameworks, the protected system contains no software.

By integrating scripts with security servers, hybrid systems 812 offer higher security and control compared to a scripting-only approach. However, hybrid systems 812 involve more administration and higher levels of network traffic. Compared to centralized frameworks 810, hybrid systems 812 are less secure. For instance, the hybrid system 812 does not prevent a perpetrator from logging on to a resource server from an unprotected workstation, and does not address the issue of unencrypted passwords traversing the network.

Figure 9:
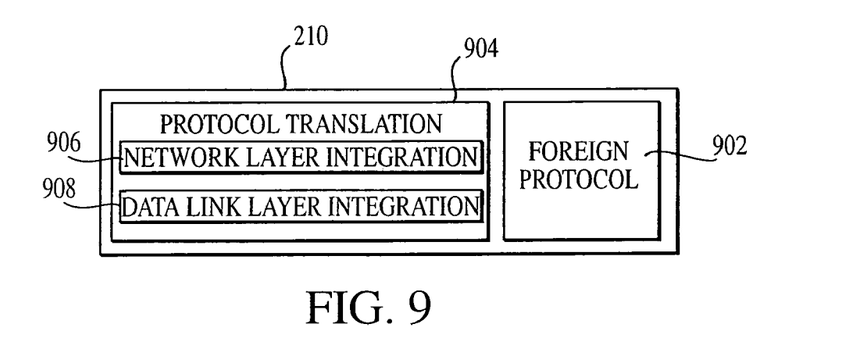
FIG. 9 is a block diagram illustrating components included in the network integration layer of the integration architecture framework in FIG. 2.

IV. Network integration layer 210, illustrated in FIG. 9, provides for disparate networks based on different protocols to communicate with one another or nodes on another network. For example, an application running on a TCP/IP network could access information in a database running on a mainframe network. Network integration layer 210 is required when two different network protocols need to communicate with one another. The network integration layer 210 establishes, maintains, and terminates logical connections between nodes across one or more physical connections.

A. Foreign protocol integration 902 adapts nodes on the network, which may be a mainframe, client, or server, to support a dominant network protocol that may not be native to the node. Foreign protocol services convert the node as opposed to the protocol.

B. Protocol Translation services 904 include network layer integration 906 and data link integration 908.

i. Integration at the data link layer 908 of the OSI Model can be used to provide connectivity between systems that use different higher layer protocols. For example, LAN workstations using TCP/IP to access a UNIX server may also use SNA to access an IBM mainframe using the same network. Integration at the Data Link Layer is achieved by data link layer (DLL) protocol conversion with Local Acknowledgment/Local Termination (LA/LT).

ii. Network layer integration services 906 establish, maintain, and terminate connections across a communication facility; which can be the public switched telephone network or private data network. Network services deliver data from one end node to another through addressing and routing. Addressing provides a way to identify where a device resides on the network. Routing is the process by which paths through the network are established for the transfer of data.

V. Presentation Integration layer 202, illustrated in FIG. 10, enables an application to manage the user-computer interface. Presentation integration includes capturing user actions and generating resulting events, presenting data to the user, and assisting in the management of the dialog flow of processing. Presentation Integration layer 202 allows combined disparate user-computer interfaces. Presentation Integration layer 202 also allows applications running on one client operating system to run in another operating system. This allows the elimination/consolidation of client devices. For example, a user currently using a 3270 terminal for one application and a PC for their office automation tools can run both applications on the PC. Presentation Integration 202 allows the business to leverage their older applications, while delivering new applications on newer technology. Two types of Presentation Integration layer 202 include screen scraping 1010 and terminal emulation 1020.

Figure 10:
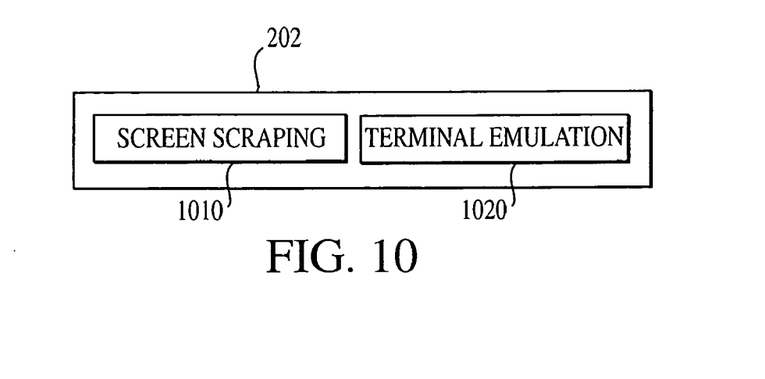
FIG. 10 is a block diagram illustrating components included in the presentation integration layer of the integration architecture framework in FIG. 2.

A. Screen scraping 1010 is similar to terminal emulation 1020, except that the user does not actually see the original user interface such as a 3270 terminal. Screen scraping provides an application program interface (API) that allows programs to read from and write to the 3270 terminal. Screen Scraping Services transforms a character based user interface into a graphical user interface (GUI). Applications can thereby be implemented using GUI tools integrating data from unchanged legacy systems together with data from other systems. An exemplary screen scrapping 1010 application is Vission:Flashpoint, by Sterling Software which includes VISION:Develop and VISION:Play. Vission:Flashpoint is a visual application development tool designed to extend the life of existing host applications by adding a GUI.

Screen scraping 1010 allows an end user access to legacy applications. The screen scraping 1010 approach is typically used when the legacy application still delivers high quality application functionality and data to the user. Screen scraping 1010 is a relatively inexpensive approach since it allows the business to leverage older applications, while delivering new applications on newer technology. More advanced products support server side screen scraping that allows the use of 3270 terminals as message layouts, by providing indirect access to screen fields. The tools are used to map logical field names to physical fields on particular screens. Applications can then access the logical fields by name without knowing what screens they come from. The server side approach is easier to maintain in an environment where the legacy systems and screens are being modified.

An important consideration in implementing screen scraping 1010 is the quality of the business logic and data within the legacy system. Screen scraping can introduce challenges in error handling and stability. Since 3270 terminals assume that a user is using them, error messages and warnings may be difficult to catch and interpret automatically for the screen scraping program. If screens that will be modified by an end user are also accessed by screen scraping 1010, any changes to the screens must be subject to change control.

B. Terminal emulation 1020 allows applications running on one client operating system to run in another operating system to consolidate client devices. For example, a user currently using a 3270 terminal for one application and a PC for their office automation tools can run both applications on the PC. Different emulation software enables a PC or workstation to perform all or some of the functions of a 3270, 3278/3279 (color terminals), or 5250 IBM terminal (AS/400 terminal). Reverse terminal emulation software enables a 3270 terminal to appear to a network as a VTxxx (e.g., VT100 or VT200) terminal.

Gateway software performs terminal emulation 1020, which makes the PC look, feel, and act like a 3270 terminal, translation, as described above, session management which includes session establishment, maintenance, and termination. Like screen scraping 1010, the capacity of the network should be reviewed in comparison to the traffic increase expected. An exemplary terminal emulation application includes Citrix Systems Inc.'s WinFrame for Networks 1.5, a Windows NT-based system for running applications remotely over network, phone or integrated services digital network (ISDN) lines. The WinFrame system allows users to store data and run applications on a central server while sending only keystrokes, mouse movements and screen objects to the server.

While this invention has been shown and described in connection with the embodiments described, it is apparent that certain changes and modifications, in addition to those mentioned above may be made from the basic features of this invention. Accordingly, it is the intention of the applicants to protect all variations and modifications invention be defined by the following claims, including all equivalents.

The invention claimed is:

1. A method for managing the integration of a plurality of disparate components into a computing network, the method comprising:
    (a) identifying the disparate components that require integration;
    (b) selecting from an integration framework an integration layer for integrating the disparate components, wherein the integration layer is selected from a plurality of integration layers including:
    a presentation integration layer,
    an application integration layer,
    an environment integration layer,
    a content integration layer and
    a network integration layer,
    wherein the application integration layer comprises at least three styles of integration including:
    a first style that provides a shared application architecture and a shared content among access channels,
    a second style that provides a shared content among access channels but utilizes a unique application architecture for each of the access channels and
    a third style that provides a unique application architecture and unique content for each of the access channels; and
    (c) integrating the disparate components after selecting the integration layer.

2. The method according to claim 1 wherein selecting the application integration layer to integrate disparate applications into the network includes:
    mapping data from a first application into a format usable by a second application; and
    translating messages from the first application into a format usable by the second application.

3. The method according to claim 2 further including delivering a translated message from the first application to the second application.

4. The method according to claim 3 wherein translating the message includes utilizing a service that may be selected from the group consisting of an E-mail translation service, an electronic data interchange translation service, an object request broker translation service and a transaction processing translation service.

5. The method according to claim 4 wherein utilizing the E-mail translation service further includes:
    translating messages from a first application format of the first application to a central switch message format; and
    thereafter translating the central switch message format to a second application format of the second application.

6. The method according to claim 4 wherein utilizing the E-mail translation service further includes:
    utilizing a gateway to directly translate messages from a first application format of the first application to a second application format of the second application.

7. The method according to claim 4 wherein utilizing the electronic data interchange translation service further includes:
    processing at least one transaction by the first application;
    translating the processed transaction using electronic data interchange translation; and
    sending the translated and processed transaction to the second application.

8. The method according to claim 1 wherein selecting the content integration layer to integrate content sources into the network includes sharing content among a first application and a second application on the network.

9. The method according to claim 8 wherein sharing content further includes:
a plurality of applications inserting data into a common database;
updating data in the common database; and
deleting data from the common database.

10. The method according to claim 9 wherein sharing content includes utilizing a service that may be selected from the group consisting of multi-media gateway services, non-relational database gateway services, SQL gateway services and web gateway services.

11. The method according to claim 1 wherein selecting the content integration layer to integrate content sources into the network further includes replicating content for a first application and a second application on the network.

12. The method according to claim 11 further including considering an amount of content to be replicated and selecting one of an extract data replication service or a capture data replication service depending on the amount identified.

13. The method according to claim 12 wherein replicating content includes utilizing services that may be selected from the group consisting of content capture services, content conversion services, content load services, coordination services and transport content services.

14. The method according to claim 1 wherein selecting the environment integration layer includes integrating disparate environments by selecting one of component translation, operating system emulation and security integration.

15. The method according to claim 14 further comprising setting up an alternate security server to guard against a primary security server of the security integration from failing.

16. The method according to claim 15 wherein the security integration may be selected from the group consisting of scripting, centralized log-in systems and a combination of scripting and centralized log-in systems.

17. The method according to claim 16 wherein selecting the combination of scripting and centralized log-in systems further includes authenticating with the primary security server in conjunction with scripting in order for a system user to obtain rights to run a script.

18. The method according to claim 1 wherein selecting the network integration layer to integrate disparate networks includes:
establishing a logical connection between a first node of a first network and a second node of a second network;
maintaining the logical connection between the first node of the first network and the second node of the second network; and
terminating the logical connection between the first node of the first network and the second node of the second network after accessing information from the second node of the second network.

19. The method according to claim 1 wherein the protocol translation service comprises both an option for network layer integration and an option for data link layer integration.

20. The method according to claim 1 wherein selecting the presentation integration layer to integrate different systems includes:
capturing user actions;
generating a resulting event based on the user actions;
presenting data to the user based on the resulting event; and
assisting in managing a dialog flow of processing between the user and the network.

21. The method according to claim 20 wherein the presentation integration layer includes selecting a service from the group consisting of screen scraping and terminal emulation.

22. A method for utilizing an application integration layer to integrate a plurality of disparate applications into a computing network, the method comprising:
(a) identifying the disparate applications that require integration;
(b) selecting from an integration framework an integration layer for integrating the disparate applications, wherein the integration layer is selected from a plurality of integration layers including:
a presentation integration layer,
an application integration layer,
an environment integration layer,
a content integration layer and
a network integration layer,
wherein the application integration layer comprises at least three styles of integration including:
a first style that provides a shared application architecture and a shared content among access channels,
a second style that provides a shared content among access channels but utilizes a unique application architecture for each of the access channels and
a third style that provides a unique application architecture and unique content for each of the access channels;
(c) after selecting the application integration layer, selecting an integration service from at least one mapping service or at least one translating service where the translating service is selected from the group consisting of an E-mail translation service, an electronic data interchange translation service, an object request broker translation service and a transaction processing translation service; and
(d) utilizing the selected integration service to integrate the disparate applications into the computing network.

23. The method according to claim 22 wherein utilizing the E-mail translation service further includes:
utilizing a gateway to directly translate messages from a first application format of the first application to a second application format of the second application.

24. The method according to claim 22 wherein utilizing the electronic data interchange translation service further includes:
processing at least one transaction by the first application;
translating the processed transaction using electronic data interchange translation; and
sending the translated and processed transaction to the second application.

25. The method for utilizing a content integration layer to integrate a plurality of disparate content sources into a computing network, the method comprising:
(a) identifying the disparate content sources that require integration;
(b) selecting from an integration framework an integration layer for integrating the disparate content sources, wherein the integration layer is selected from a plurality of integration layers including:
a presentation integration layer,
an application integration layer,
an environment integration layer,
a content integration layer and
a network integration layer, wherein the application integration layer comprises at least three styles of integration including:
a first style that provides a shared application architecture and a shared content among access channels,
a second style that provides a shared content among access channels but utilizes a unique application architecture for each of the access channels and
a third style that provides a unique application architecture and unique content for each of the access channels;
(c) after selecting the content integration layer, selecting an integration service from the group consisting of multi-media gateway services, non-relational database gateway services, SQL gateway services and web gateway services; and
(d) utilizing the selected integration service to integrate the disparate content sources into the computing network.

26. An integration architecture framework for use in the integration of disparate components into a computing network, comprising:
(a) a presentation integration layer to integrate computer-user interfaces;
(b) an application integration layer to integrate at least one application message between a first application and a second application;
(c) an environment integration layer to provide sign-on security to the computing network;
(d) a content integration layer to provide for the sharing of content between the first application and the second application; and
(e) a disparate network integration layer to connect a first node of a first network and a second node of a second network, wherein the application integration layer comprises at least three styles of integration including:
a first style that provides a shared application architecture and a shared content among access channels,
a second style that provides a shared content among access channels but utilizes a unique application architecture for each of the access channels and
a third style that provides a unique application architecture and unique content for each of the access channels;
(f) wherein the layers (a)–(e) cooperate to integrate disparate components into the computing network in a way that appears transparent to a user.

27. The framework according to claim 26 wherein the application integration layer further includes:
a data mapping application to map data from the first application into a format usable by the second application; and
a message translating application to translate messages from the first application into a format usable by the second application.

28. The framework according to claim 27 wherein the computing network delivers a translated message from the first application to the second application.

29. The framework according to claim 28 wherein the message translating application may be selected from the group consisting of an E-mail translation service, an electronic data interchange translation service, an object request broker translation service and a transaction processing translation service.

30. The framework according to claim 26 wherein the content integration layer utilizes a service that may be selected from the group consisting of multi-media gateway services, non-relational database gateway services, SQL gateway services and web gateway services.

31. The framework according to claim 30 wherein the content integrating layer utilizes a service that replicates content for a first application and a second application on the network.

32. The framework according to claim 31 wherein the architect considers an amount of content to be replicated in determining whether to utilize an extract data replication service or a capture data replication service.

33. The framework according to claim 31 wherein the replication service may be selected from the group consisting of content capture services, content conversion services, content load services, coordination services and transport content services.

34. The framework according to claim 26 wherein the environment integration layer includes integration services that may be selected from the group consisting of component translation, operating system emulation and security integration.

35. The framework according to claim 34 wherein the security integration may be selected from the group consisting of scripting, centralized log-in systems and a combination of scripting and centralized log-in systems.

36. The framework according to claim 26 wherein the network integration further includes a logical connection between a first node of a first network and a second node of a second network, wherein the logical connection between the first node of the first network and the second node of the second network is maintained until information is accessed from the second node of the second application, thereafter the logical connection is terminated.

37. The framework according to claim 26 wherein the protocol translation service comprises both an option for network layer integration and an option for data link layer integration.

38. The framework according to claim 37 wherein the presentation integration includes integration services that may be selected from the group consisting of screen scraping and terminal emulation.

* * * * *